(12) United States Patent
Klein et al.

(10) Patent No.: US 7,536,381 B2
(45) Date of Patent: May 19, 2009

(54) SYSTEMS, METHODS AND COMPUTER PROGRAM PRODUCTS FOR DATA PROCESSING

(75) Inventors: Markus Klein, Frankenthal (DE); Kai-Michael Roesner, Eggenstein-Leopoldshafen (DE)

(73) Assignee: SAP AG, Walldorf (DE)

( * ) Notice: Subject to any disclaimer, the term of this patent is extended or adjusted under 35 U.S.C. 154(b) by 481 days.

(21) Appl. No.: 11/091,578

(22) Filed: Mar. 29, 2005

(65) Prior Publication Data

US 2005/0216494 A1 Sep. 29, 2005

(30) Foreign Application Priority Data

Mar. 29, 2004 (EP) .................................. 04007525

(51) Int. Cl.
*G06F 17/30* (2006.01)
(52) U.S. Cl. .......................................... 707/3; 707/102
(58) Field of Classification Search ..................... 707/3, 707/1, 102, 2
See application file for complete search history.

(56) References Cited

U.S. PATENT DOCUMENTS

| | | | | | |
|---|---|---|---|---|---|
| 4,774,661 | A | * | 9/1988 | Kumpati | 707/3 |
| 5,903,898 | A | * | 5/1999 | Cohen et al. | 707/204 |
| 5,950,190 | A | * | 9/1999 | Yeager et al. | 707/3 |
| 5,974,418 | A | * | 10/1999 | Blinn et al. | 707/100 |
| 6,003,040 | A | * | 12/1999 | Mital et al. | 707/103 R |
| 6,952,704 | B2 | * | 10/2005 | MacLeod et al. | 707/103 R |
| 7,016,894 | B2 | * | 3/2006 | Saeki | 707/3 |
| 7,171,352 | B2 | * | 1/2007 | Chang et al. | 704/9 |
| 7,174,341 | B2 | * | 2/2007 | Ghukasyan et al. | 707/102 |
| 2004/0024753 | A1 | * | 2/2004 | Chane et al. | 707/3 |

FOREIGN PATENT DOCUMENTS

EP     0 425 222 A2    5/1991

OTHER PUBLICATIONS

Lefty Leverenz, Diana Rehfield: "Oracle 8i Concepts, vol. 1, Reslease 8.1.5" Feb. 1999, Oracle Corporations, pp. 1-21, 2-2, 2-24, 10-20.*

PCT International Search Report and Written Opinion, mailed on Aug. 1, 2005, in related PCT Application No. PCT/EP2005/001806 (16 pages).

Lefty Leverenz et al., "Oracle 8i Concepts, vol. 1, Release 8.1.5," Oracle Corporations, Feb. 1999, pp. 1-21, 1-24, 1-25, 2-2, 2-3, 2-4, 2-5, 2-7, 10-20 and 10-21.

(Continued)

*Primary Examiner*—Jean M Corrielus
*Assistant Examiner*—Sherief Badawi
(74) *Attorney, Agent, or Firm*—Finnegan, Henderson, Farabow, Garrett & Dunner LLP (57) ABSTRACT

Systems, methods and computer program products are provided for data processing. In one implementation, a data processing system is provided that comprises storage means for storing a data category definition table. The data category definition table may include at least the following entries for each data category: a unique name of the data category, a data table identifier for identification of a data table storing data sets of the data category, and a data structure table identifier for identification of a data structure table storing key field and data field names of the data table.

16 Claims, 4 Drawing Sheets

OTHER PUBLICATIONS

Anonymous, "Oracle Warehouse Builder: A Technical Overview," Oracle Technical White Paper, Feb. 2000, pp. 1-21.

A. P. Madurapperuma et al., "A Visual Query Interface for a Customisable Schema Visualisation System," Database Engineering and Applications Symposium, 1997, Ideas '97 Proceedings., International Montreal, Que., Canada, Aug. 25-27, 1997, Los Alamitos, CA, USA, IEEE Comput. Soc., US, Aug. 25, 1997, pp. 23-32.

European Search Report, dated Aug. 17, 2004 (1 page).

* cited by examiner

SYSTEMS, METHODS AND COMPUTER PROGRAM PRODUCTS FOR DATA PROCESSING

BACKGROUND

1. Field of the Invention

The present invention generally relates to electronic data processing and database systems. More particularly, and without limitation, the invention relates to systems, methods, and computer program products for data processing.

2. Background Information

A significant problem in computer systems is the efficient use and management of the data stored in memory. The earliest computers maintained an independent file or database for the exclusive use of each program which ran on the computer. The difficulty with this arrangement is that for similar application programs, the databases maintained by each of these programs contained a significant amount of data redundancy.

One solution to this problem is the creation of a common database representing the collection of all interrelated data to serve a number of application programs. The data is stored in the database in an order or arrangement which is independent of the ordering of the data in the application programs which use the data.

Typically, a computer has a database management system which is a set of program instructions to manage this data and to function as an interface between the data and the application programs requesting access to the data. In prior systems, the database management system interface function is accomplished by a structure known as a schema. The schema is a mapping or a data model for the database. The schema indicates which elements in the database are required for use by a particular application program. In this fashion, the database management system isolates users from each other, since each application program accesses the common database through the schema which is maintained in the database management system for that particular application program. The schema permits access only to the data required for the operation of each application program.

Each database management system has its own architecture which relates to the physical structure and organization of the memory devices which are controlled by the database management system. The architecture also defines the logical interconnection and interrelation of the various files, records, record segments and schemas within the common database. This architecture is defined at the time the database is created and is reflected in an entity contained in each database management system called the data dictionary.

The data dictionary is a software structure that contains a list of all the application program databases contained in the common database and their associated schemas. The data dictionary also contains a definition of each schema and the various types of data elements which are stored in memory along with data security information.

One difficulty with existing data dictionaries is that they are static and cannot be changed except by the database administrator. Further, the database administrator must recompile the database system and the data dictionary with each change that is made to these elements.

A computer system user is typically unaware of the underlying database management system architecture and has no ability to change this architecture except through the database administrator. The database management system also stores data in a form and format dictated by the database management system architecture. The data can be accessed only by requesting the data in a manner that is consistent with this form and format. Therefore, the computer system user must write database-dependent application programs (data form and format specific) to access the data stored in the database. This rigidity of known database management systems introduces a whole new set of problems, since the user cannot obtain information describing the collection of all data residing in the database. The user also cannot obtain the information contained in the database in a form and organization desired by the user without extensive application programs created by software experts.

U.S. Pat. No. 4,774,661 shows a database management system which has an active data dictionary that the user can both access and modify. The user makes use of simple commands to control, order and query not only the underlying data controlled by the database management system, but also the contents of the data dictionary.

This capability enables the user to write generic application programs which are logically independent of the data, since the subject database management system enables the user/application program to access all data in the database independent of each application program's data model.

One disadvantage of database management systems of this type is that the application programs need to be aware of the multiple specific databases. In particular, it is a disadvantage of known systems that the application programs require knowledge of the structures of the databases and need to be programmed accordingly.

SUMMARY

In view of the foregoing, methods, systems and computer program products are provided for data processing. Such methods, systems and computer applications may overcome one or more of the drawbacks mentioned above, consistent with embodiments of the invention.

In accordance with one embodiment, a data processing system is provided that includes storage means for storing a data category definition table. The data category definition table is used for storing data category definitions. A data category definition is given by a unique name of the data category, a data table identifier for identification of a data table storing data sets of the data category, and a data structure table identifier for identification of a data structure table storing key field and data field names of the data table. In addition, the data category definition table can comprise one or more control flags. Preferably, the data category definition table also enables the application programs to assign semantics to the data of the given data category. In other words, certain functionalities can be assigned to a data category. As a result, a semantic network may be defined that is commonly used by a plurality of application programs.

In accordance with another embodiment of the invention, the data category definition table has a manual control flag. When the manual control flag for a data category is set, this indicates that a manual entry operation of a data set is allowed.

In accordance with a further embodiment of the invention, the data category definition table has a history flag. If the history flag is set, this means that the change history of the data table of the given data category is to be tracked. For this purpose, the data category definition table has a history table identifier for identification of a history table for storing the change history of the data table of the given data category.

Data processing systems consistent with the present invention may include a write interface for writing a data set to one of the data tables. The write interface can receive one of the unique names of a selected data category from an application program. In response, the write interface returns the key field and data field names of the data table of the selected data category. This enables the application program to provide the data set to the write interface in a form where each data value of the data set is assigned to one of the key field or data field names.

Further, the data processing system may include a read interface for reading a data set from one of the data tables. Like the write interface, the read interface can receive one of the unique names of a selected data category from an application program. In contrast to the write interface, the read interface only provides the key field names of the data table of the selected data category to the application program. The key field names that are returned to the application program enable the application program to generate a query using the key field names. The query is executed by the data processing system and the result is returned to the application program.

Embodiments of the present invention may be advantageously implemented for data processing applications using multiple application programs. The data category definitions on which the data storage and retrieval is based, i.e., the semantic network, may enable a high degree of independence of the application programs and the common database used by the application programs. In fact, the application programs do not require information on the structure of the database, but only knowledge of the data category names.

Another advantage is that the data category definitions can contain control parameters such as flags for controlling the application programs and/or operation of the data processing system itself.

Embodiments of the present invention are further directed to computer systems, computer programs, computer readable media and carrier signals, each comprising program code or instructions for providing a data processing systems as described above.

Computer programs consistent with the invention can be installed as one or more programs or program modules on different hardware systems (computers or computer systems), run separately and independently of each other, and in their entirety be capable of performing methods and features consistent with embodiments of the invention. Furthermore, the different systems may be connected or arranged in the form of a network to communicate with each other.

Additional objects, advantages and embodiments of the invention will be set forth in part in the description, or may be learned by practice of the invention. Objects and advantages of the embodiments of the invention can be realized and attained by means of the elements and combinations particularly pointed out in the appended claims.

It is understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

The accompanying drawings, which are incorporated in and constitute a part of this specification, illustrate embodiments of the present invention and, together with the description, explain principles of the invention. In the drawings.

DETAILED DESCRIPTION

Reference will now be made in detail to exemplary embodiments of the invention illustrated in the accompanying drawings and described below. Wherever possible, the same reference numbers will be used throughout the drawings to refer to the same or like parts.

Figure 1:
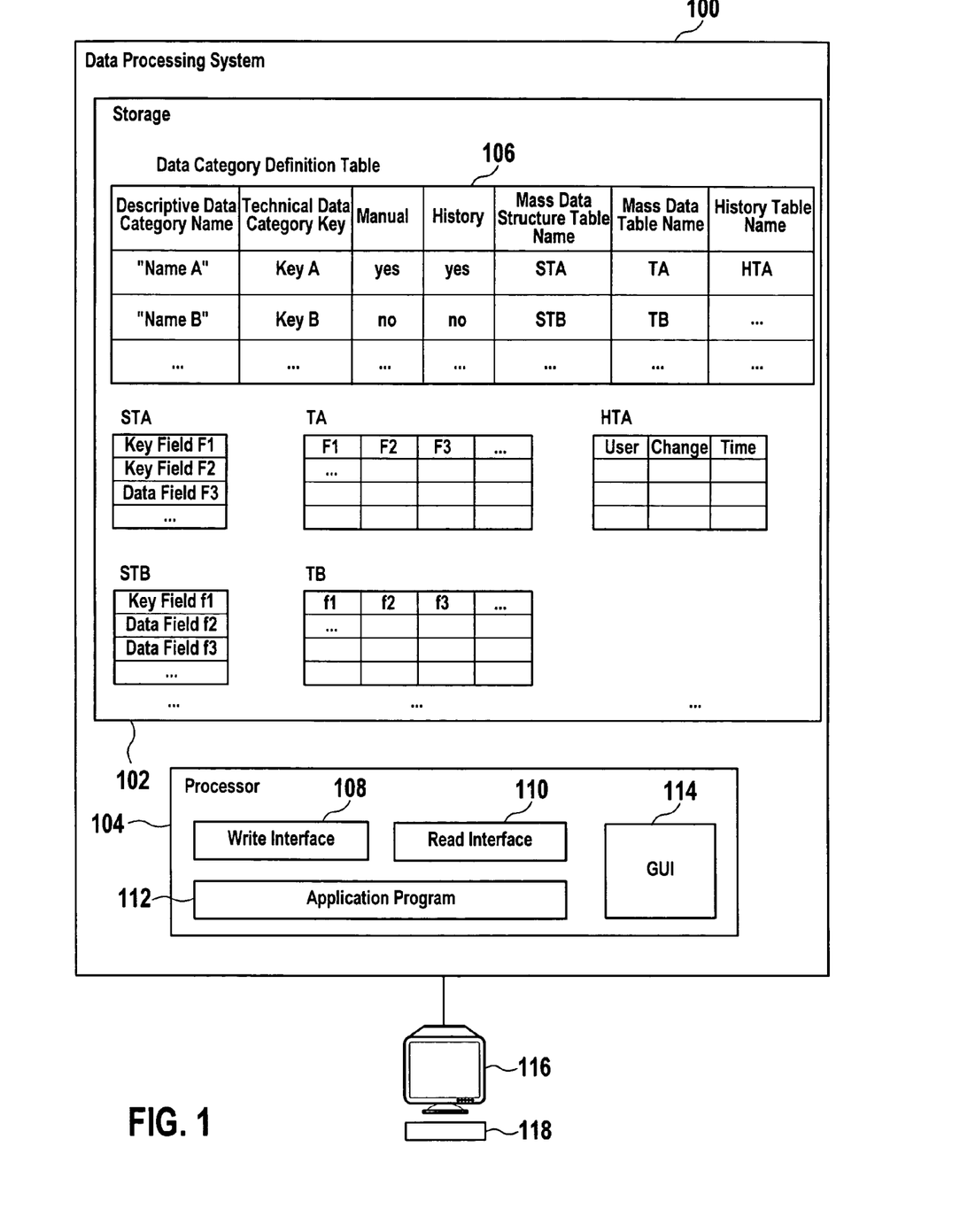
FIG. 1 is a block diagram of an exemplary data processing system, consistent with an embodiment of the invention.

FIG. 1 shows an exemplary data processing system 100. Data processing system 100 includes a storage 102 and a processor 104. Storage 102 may provide storage of data category definitions and mass data of the various data categories.

As shown in the example of FIG. 1, data category definition table 106 is stored in storage 102. Data category definition table 106 includes a row for each defined data category. In the embodiment considered here, data category definition table 106 includes the following rows:

'descriptive data category name' for entry of a descriptive name of a defined data category, 'technical data category key' for entry of a technical name of a defined data category, 'manual' for setting a manual flag indicating whether a manual data entry operation is allowed or not, 'history' for setting a history flag that indicates whether a change history is to be tracked or not, 'mass data structure table name' for storing an identifier, such as a table name, of a mass data structure table that stores the key field and data field names of the mass data table in which the mass data of the data category are stored, 'mass data table name' for storing an identifier, such as a table name, of the mass data table of the data category, and 'history table name' for storing an identifier, such as a name, of the history table that is used for storing the change history of the mass data stored in the mass data table of the data category. The history table name field with the data category definition table 106 is empty for data categories for which the history flag is 'no'.

For convenience of explanation, two defined data categories are shown in data category definition table 106, by way of example. In the first row of data category definition table 106, data category having data category name 'Name A' is defined. Data category 'Name A' has technical data category key 'Key A'. The manual and history flags are set for data category 'Name A'. The name of the mass data structure table of data category 'Name A' is STA. The name of the mass data table storing the mass data of data category 'Name A' is TA. As the history flag is set for data category 'Name A', a history table name HTA is stored for that data category in data category definition table 106.

Mass data structure table STA stores the key and data field names of mass data table TA. In the example considered here, mass data table TA has key field names F1, F2 and data field names F3, . . .

History table HTA of data category 'Name A' has table fields for tracking a change history of the mass data stored in mass data table TA. In the example considered here, an identifier of a user that has performed a change in the mass data table TA, the kind of change that has been performed and a time stamp identifying the point of time when the change was entered are stored. In addition, the history table HTA contains the data fields of the mass data tables for which the history is tracked.

In addition, data category definition of data category 'Name B' is shown in data category definition table 106. Data category 'Name B' has mass data structure table STB and mass data table TB but no history table as the history flag is not set for data category 'Name B'. In the example considered here, mass data table TB has key field name f1 and data field names f2, f3, . . .

It is to be noted that data category definition table 106 and mass data structure tables STA, STB, . . . provide the meta data for the data category definitions, whereas mass data tables TA, TB, . . . serve for storage of the mass data of the defined data categories.

Processor 104 serves for execution of write interface module 108 and read interface module 110. Write interface module 106 provides a write interface for application program 112 for writing of data sets to mass data tables of storage 102 and read interface module 110 provides a read interface for application program 112 for reading of data set from mass data tables.

In the example considered here, application program 112 is also executed by processor 104. It is to be noted that application program 112 can be executed on a remote computer that is coupled to data processing system 100 by means of a network.

Further, it is important to note that write interface module 108 and read interface module 110 can not only be used by application program 112, but also by other application programs that can interact with write interface module 108 and read interface module 110. An example for such a distributed computing system will be explained in more detail below making reference to FIG. 4.

Processor 104 serves for execution of a graphical user interface (GUI) module 114. Data processing system 100 includes a physical user interface, e.g., a monitor 116 and keyboard 118 that are coupled to data processing system 100 for viewing and entering data and/or commands by a user.

Initially, the data category definitions need to be entered into storage 102. This can be done manually by an administrator by means of the graphical user interface provided by GUI module 114, monitor 116 and keyboard 118. The user enters the data category definitions into data category definition table 106 and mass data structure tables STA, STB, . . .

Alternatively, data processing system 100 is delivered with default data category definitions that can be modified by the user for the purpose of customization. If default data categories are delivered it is also possible for a user to define additional custom data categories.

In operation, application program 112 can write data sets to storage 102 through write interface module 108. This can be done either automatically without human interaction or involving a manual input operation of the data set into the application program 112 by a user. Likewise, application program 112 can perform a read access by means of read interface module 110 in order to retrieve one or more data sets from storage 102.

Figure 2:
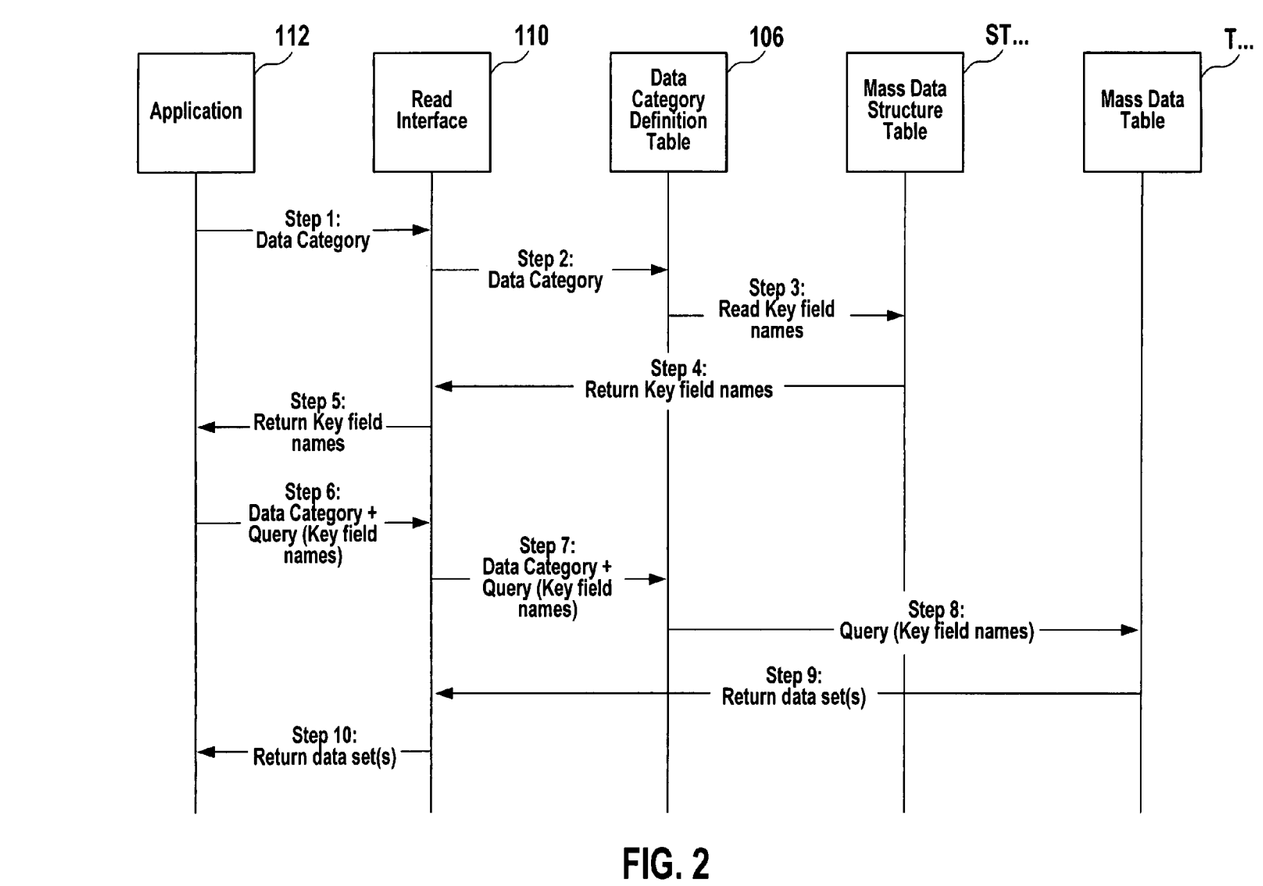
FIG. 2 shows an exemplary sequence diagram for performing a data query, consistent with an embodiment of the invention.
Figure 3:
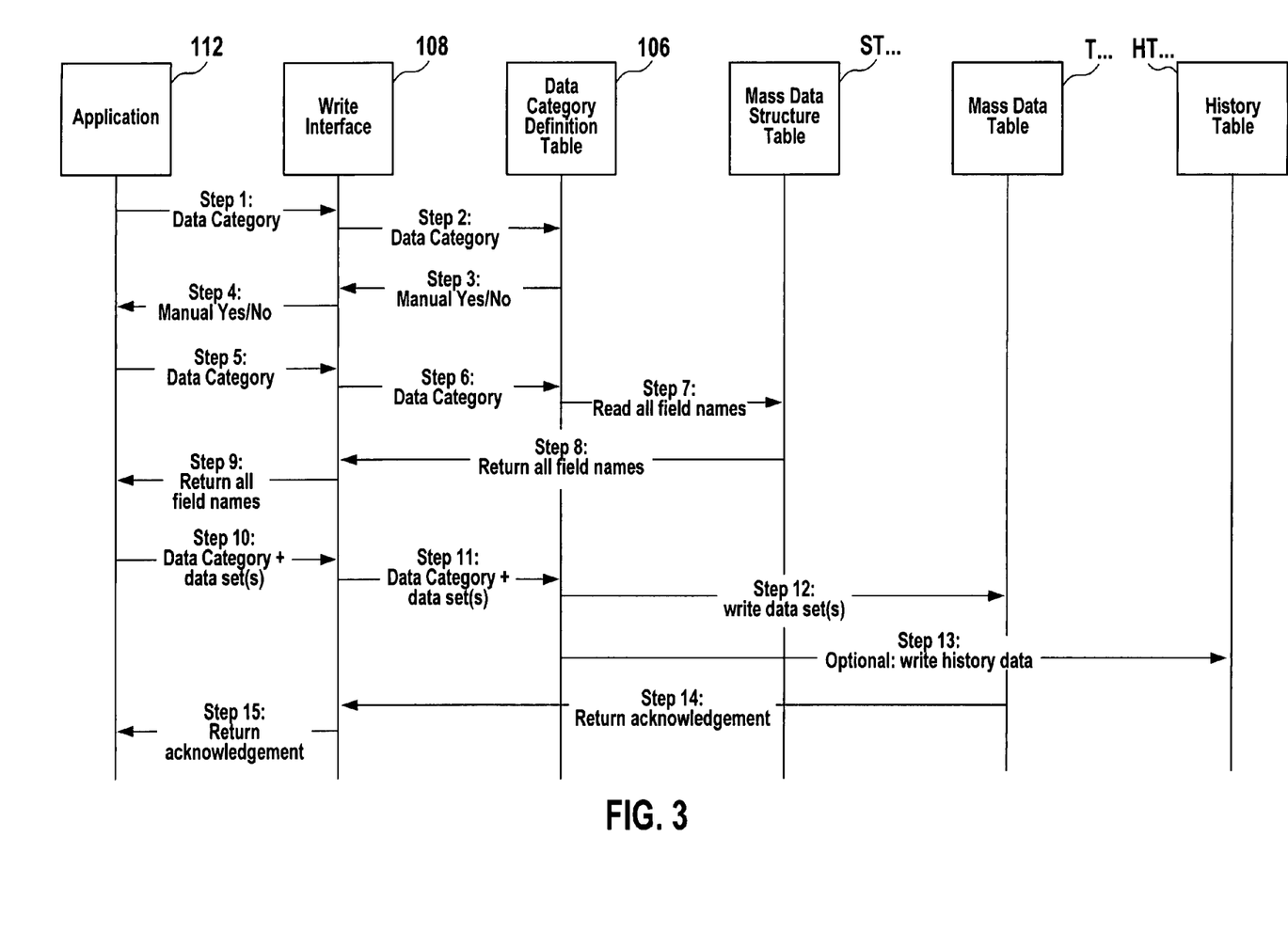
FIG. 3 shows an exemplary sequence diagram for performing a write operation, consistent with an embodiment of the invention.

For purposes of illustration, corresponding read and write operations are provided in detail in the examples FIGS. 2 and 3, respectively.

FIG. 2 shows an exemplary sequence diagram involving application program 112, read interface module 110, data category definition table 106, mass data structure tables STA, STB, . . . , and mass data table TA, TB, . . .

Application program 112 includes access to a customizing table that stores the technical data category keys of the predefined data categories. The customizing table of the application program assigns one or more data categories to specific actions or data processing tasks of the application program. When a specific action or data processing task is performed, the application program uses the assigned data category in order to perform a read and/or write access to the database. One advantage of this approach is that the application programs do not require information on the internal structure of the database for a read and/or write access via the respective interface.

Application program 112 requires to retrieve data sets of one of the predefined data categories. For this purpose, application program 112 enters the technical data category key of the desired data category into read interface 110 (step 1).

Read interface 110 performs an access operation (step 2) in order to access data category definition table 106 on the basis of the technical data category key for retrieval of the mass data structure table name of the desired data category. The mass data structured table of the desired data category stored in data category definition table 106 is read in order to obtain the key field names of the respective mass data table (step 3).

In step 4, the key field names are returned to the read interface 110 which provides the key field names to application program 112 (step 5). Application program 112 uses the key field names to generate a query that specifies a profile of the data set of the desired data category that application program 112 needs to retrieve. In step 6, application program 112 sends the technical data category key of the desired data category together with the generated query to read interface 110.

Read interface 110 uses the technical data category key in order to retrieve the mass data table name of the desired data category from data category definition table 106 (step 7). In step 8, the query is executed on the mass data table of the desired data category. This results in one or more data sets that are returned from the mass data table to read interface 110 (step 9) which provides the one or more data sets to application program 112 in step 10.

In one embodiment, the technical data category keys are used by the application program 112 in order to unequivocally specify a desired data category as it is only guaranteed for the technical data category keys that they are unique. However, it is preferred that application program 112 uses the technical data category keys for identification of a desired data category.

Further, it is to be noted that the only knowledge application program 112 requires for retrieving one or more data sets of the desired data category is the descriptive data category name or the technical data category key. No other structural knowledge is required by application program 112 for generation of the query. This is advantageous as it makes the program logic of application program 112 independent from the database structure of data processing system 100.

FIG. 3 shows an exemplary sequence diagram for a write operation.

When application program 112 needs to write one or more data sets of a certain data category to the database (storage 102) it sends the technical data category key to write interface 108 (step 1). Again, application program 112 can use the descriptive data category name as an alternative in order to indicate the desired data category.

Write interface 108 uses the technical data category key provided by application program 112 in order to read the manual flag of the specified data category from data category definition table 106 (step 2). The retrieved manual flag information is provided from data category definition table 106 to write interface module 108 (step 3) from where it is returned to application program 112 (step 4).

If application program 112 is in a manual data entry mode and the manual flag is not set application program 112 displays a message in order to inform the user that no manual data entry is possible. If the manual flag is set or if the application program 112 is in an automatic data entry mode, step 5 is performed in which application program 112 again provides the technical data category key of the desired data category to write interface 108.

Write interface 108 uses the technical data category key in order to retrieve the mass data structure table name of the specified data category from the data category definition table 106 (step 6). The field names, including key field and data field names, stored in the mass data structure table are read in step 7 and returned to write interface 108 in step 8 which forwards the field names to the application program 112 in step 9.

Application program 112 uses the field names received in step 9 to format the one or more data sets it needs to store in a database, such that all data values of a data set are assigned to one of the provided field names. The technical data category key together with the one or more formatted data sets is provided from application program 112 to write interface 108 in step 10. Write interface 108 uses the technical data category key in order to retrieve the mass data table name of the desired data category from data category definition table 106 (step 11). In step 12, the one or more data sets are written to the identified mass data table. If the history flag is set, corresponding history data is written to the history table of the desired table category as stored in data category definition table 106.

When the write operation has been completed successfully, an acknowledgement is returned (step 14) and transmitted from write interface 108 to application program 112 (step 15).

For example, when application program 112 needs to retrieve a data set of descriptive data category 'Name A' it sends the corresponding technical data category key 'Key A' to read interface 110. Read interface 110 uses mass data structure table name STA of the respective data category definition to read the key field names F1 and F2 stored in mass data structure table STA.

The key field names F1 and F2 are returned to application 112 that uses the key field names to generate a query specifying a desired profile of the data sets that need to be retrieved. Application number 112 sends the query together with Key A to read interface 110 which uses Key A to read the mass data table name TA from the data category definition table 106 in order to perform the query in the identified mass data table TA. The data sets that are identified in mass data table TA by execution of the query are returned to the application program 112.

If application program 112 requires to perform a write operation of a data set of data category 'Name A', application program 112 sends Key A to write interface 108. Write interface 108 uses Key A to read the manual flag of the identified data category from the data category definition table 106 and it returns the value of the manual flag to application program 112.

If the manual flag matches the entry mode of the application program 112, application program 112 again sends Key A to write interface 108. Write interface 108 uses key A in order to retrieve the mass data structured table name STA of the desired data category from data category definition table 106. All the field names including key and data field names, are read from mass data structure table STA and returned to application program 112.

Application program 112 assigns a data value to each one of the key and data field names and sends the data set together with Key A to write interface 108. Write interface 108 uses Key A to retrieve the respective mass data table name TA. Next, the data sets are written to mass data table TA. When the history flag is set, a corresponding entry is made in the history table HTA. Finally, an acknowledgement is provided to application program 112, when the write operation has been successfully competed.

Figure 4:
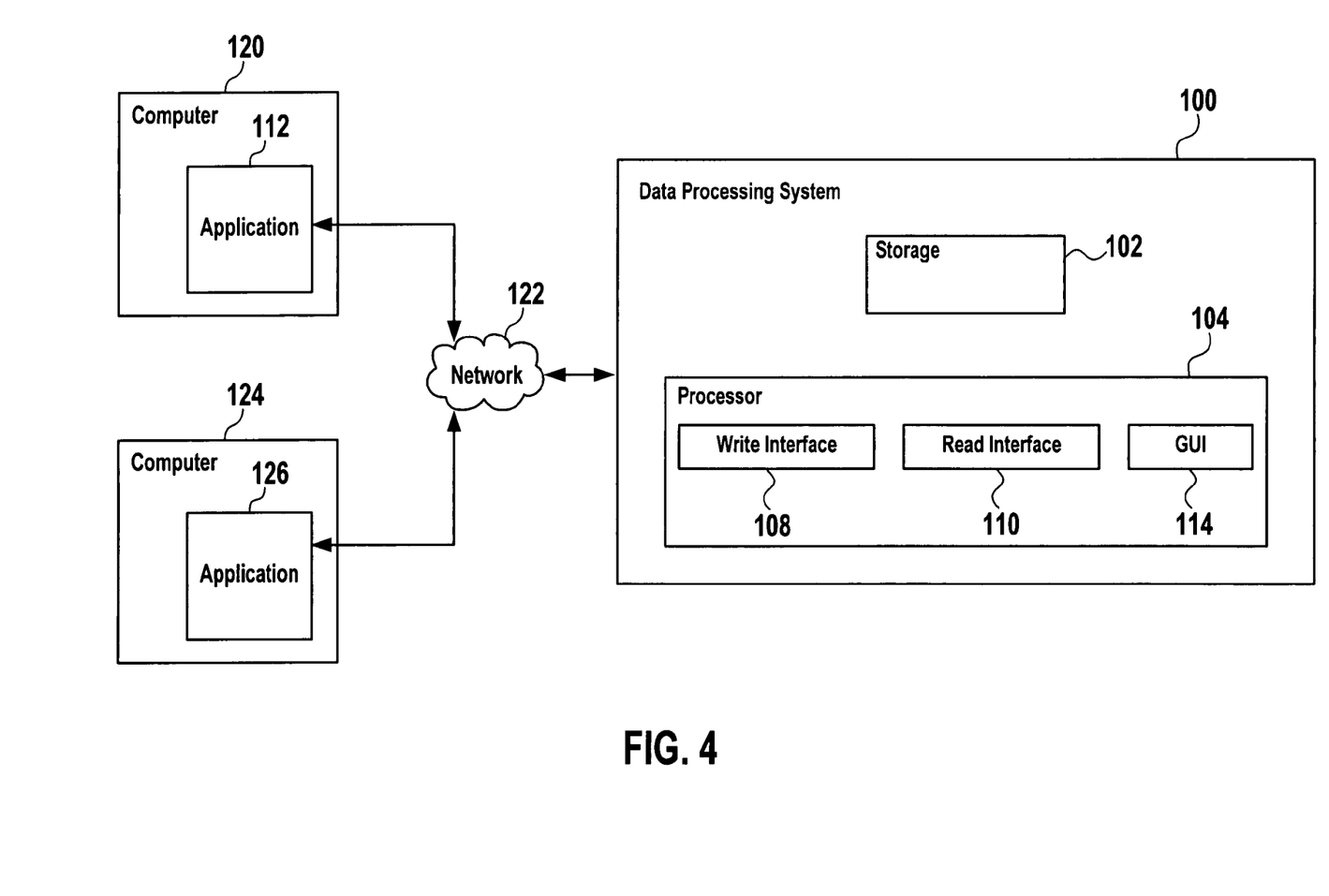
FIG. 4 shows a block diagram of another exemplary data processing system where the application programs run on distributed computers coupled to the data processing system.

FIG. 4 shows an alternative embodiment of the data processing system of FIG. 1. Elements in the embodiment of FIG. 4 that correspond to elements of FIG. 1 are designated by the same reference numerals.

In the embodiment of FIG. 4, application program 112 is executed by computer 120 that is coupled to data processing system 100 by means of network 122. Network 122 may comprise the Internet, an intranet and/or another computer network.

A plurality of additional computers running additional application programs are also coupled to data processing system 100 through network 122. For ease of explanation only one of the additional computers 124 running application program 126 is shown in FIG. 4.

Application programs 112 and 126 can perform read and/or write operations in order to read and/or write data sets from or to storage 102 independently from each other. Other than the descriptive data category names and/or technical data category keys as defined in the data category definition table 106 of storage 102 the application programs running on the distributed computers 120, 124, ... do not require any knowledge of the structure of the database provided by data processing system 100. This greatly facilitates the task of programming and maintaining various application programs in a multi-computing environment.

Embodiments of the present invention may be beneficial for complex computing tasks where multiple application programs use the same database. Applications include, for instance, financial computer systems and computer systems for managing medical data. By way of example, a data category can be defined as a certain price type or as a certain patient type.

Other embodiments of the invention will be apparent to those skilled in the art from consideration of the specification and practice of embodiments of the invention disclosed herein. It is intended that the specification and examples be considered as exemplary only, with a true scope and spirit of the invention being indicated by the following claims.

LIST OF REFERENCE NUMERALS 100 data processing system
102 storage
104 processor
106 data category definition table
108 write interface module
110 read interface module
112 application program
114 GUI module
116 monitor
118 keyboard
120 computer
122 network
124 computer
126 application program

What is claimed is:

1. A data processing system comprising:
   storage means for storing a data category definition table, the data category definition table comprising at least the following entries for each data category to define a semantic network for use by a plurality of application programs:
   a unique name of the data category,
   a data table identifier for identification of a data table storing data sets of the data category,
   a data structure table identifier for identification of a data structure table storing key field and data field names of the data table, and
   a manual flag for each data category for indicating to the application programs whether manual entry of a data set of the data category is enabled or not,
   a write interface for writing a data set to one of the data tables having a schema defining a structure of the one data table, the write interface performing the following:
   receiving one of the unique names from one of the plurality of application programs,
   returning the key field and data field names of the data table of the data category having the one unique name to the application program,
   receiving a data set and the one of the unique names from the application program, each data value of the data set being assigned to one of the key field or data field names,
   writing the data set in the data table of the data category having the one unique name, the write interface writing the data set into the data table independent of use of information describing the schema of the data table,
   reading the manual flag, and
   returning the manual flag information to the application programs, and
   a read interface for reading a data set from one of the data tables, the read interface performing the following:
   receiving one of the unique names from one of the plurality of application programs,
   returning the key field names of the data table of the data category having the one unique name to the application program,
   receiving a query with the key field names from the application program,
   returning the at least one data set resulting from the query to the application program by reading from the one data table independent of use of information describing the schema of the one data table,
   reading the manual flag, and
   returning manual flag information to the application programs.

2. The data processing system of claim 1, the data category definition table further comprising for each data category:
   a history flag, and
   if the history flag is set, a history table identifier for identification of a history table, the history table storing a change history of the data table of the data category.

3. The data processing system of claim 1, the data categories being price types.

4. A computer program product embodied in a computer-readable medium for processing a data set, the computer program product comprising instructions executed on a processor for:
   accessing storage means, the storage means storing a data category definition table, the data category definition table comprising at least the following entries for each data category:
   a unique name of the data category,
   a data table identifier for identification of a data table storing data sets of the data category,
   a data structure table identifier for identification of a data structure table storing key field and data field names of the data table, and
   a manual flag for each data category for indicating to an application program whether manual entry of a data set of the data category is enabled or not,
   writing the data set to one of the data tables having a schema defining a structure of the one data table by performing the following:
   receiving one of the unique names from the application program,
   returning the key field and data field names of the data table of the data category having the one unique name to the application program,
   receiving a data set and the one of the unique names from the application program, each data value of the data set being assigned to one of the key field or data field names,
   writing the data set in the data table of the data category having the one unique name independent of use of information describing the schema of the data table,
   reading the manual flag, and
   returning manual flag information to the application program, and
   reading the data set from one of the data tables by performing the following:
   receiving one of the unique names from the application program,
   returning the key field names of the data table of the data category having the one unique name to the application program,
   receiving a query with the key field names from the application program, and
   returning the at least one data set resulting from the query to the application program by reading from the one data table independent of use of information describing the schema of the one data table.

5. The computer program product of claim 4, further comprising instructions for:
   reading a history flag of the data category of the one unique name from the data category definition table,
   reading a history table identifier from the data category definition table if the history flag is set, and
   updating the history table.

6. An application computer program product comprising instructions executed on a processor for processing a data set, the database comprising storage means for storing a data category definition table, the data category definition table comprising at least the following entries for each data category:
   a unique name of the data category,
   a data table identifier for identification of a data table storing data sets of the data category and having a scheme defining a structure of the data table,
   a data structure table identifier for identification of a data structure table storing key field and data field names of the data table, and
   a manual flag for indicating to an application program whether manual entry of a data set of the data category is enabled or not, the instructions being executed to write the data set by:
    entering one of the unique names into the storage means,
    receiving the key field and data field names of the data table of the data category having the one unique name,
    entering the data set and the one of the unique names into the storage means independent of use of information describing the schema of the data table, each of the data values of the data set being assigned to one of the key field or data field names reading the manual flag, and
    retuning manual flag information to the application program, and
the instructions being executed to read the data set by:
    entering one of the unique names into the storage means,
    receiving the key field names of the data table of the data category having the one unique name,
    entering a query using the key field names,
    receiving a result of the query by reading from the data table independent of use of information describing the schema of the data table.

7. A data processing system comprising:
    means for processing data sets obtained from a plurality of data sources using a plurality of application programs,
    storage means for storing a data category definition table for each of a plurality of data types coming from plurality of data sources using a semantic description, the data category having a unique name,
    a write and a read interface for accessing data tables storing information that uniquely relates the plurality of data types coming from the plurality of data sources, the data tables having schemas defining structures of the data sources, wherein the accessing is performed independent of use of information describing the schemas of the data tables,
    means for returning at least one data set resulting from the use of the data category definition table and the data tables comprising information that uniquely relates the plurality of data sources,
    means for reading a manual flag indicating to the application programs whether manual entry of a data set of the data category is enabled or not, and
    means for retuning manual flag information to the application program,
    wherein the write interface:
        receives the unique name from an application program,
        returns the key field and data field names of the data table of the data category having the unique name to the application program,
        receives a data set and the unique name from the application program, each data value of the data set being assigned to one of the key field or data field names, and
        stores the data set in the data table of the data category having the unique name, and
    wherein the read interface:
        receives the unique name from the application program,
        returns the key field names of the data table of the data category having the unique name to the application program,
        receives a query with the key field names from the application program, and
        returns the at least one data set resulting from the query to the application program.

8. The data processing system of claim 7, wherein data category definition table further comprises:
    a descriptive data category name,
    a technical data category key,
    a manual setting representation,
    a historical setting representation,
    a data table identifier, and
    a data structure table identifier.

9. The data processing system of claim 7, wherein at least one of the application programs is adapted to assign semantic description to the data types on the basis of the data category definition table.

10. The data processing system of claim 7, further comprising means for processing a user query against the data category definition table to identify data sets coming from one or more of the plurality of data sources relevant to the query.

11. The data processing system of claim 7, further comprising means for converting the plurality of data types coming from different data sources and having different semantic descriptions to a uniform concept of the data category definition table.

12. The data processing system of claim 7, the data category definition table further comprising for each data category,
    a history flag, and
    if the history flag is set, a history table identifier for identification of a history table, the history table storing a change history of the data table of the data category.

13. The data processing system of claim 7, wherein the semantic description comprises a set of descriptive data category names.

14. The data processing system of claim 7, the data categories being price types.

15. A computer program product stored on a computer readable medium for use in a computer system comprising instructions for:
    processing data sets obtained from a plurality of data sources using a plurality of application programs,
    accessing storage means, the storage means storing a data category definition table for each of data types coming from the plurality of data sources using a semantic description,
    accessing data tables storing information that uniquely relates the plurality of data types coming from the plurality of data sources using a write and a read interface, the data tables having schemas defining structures of the data sources, wherein the accessing is performed independent of use of information describing the schemas of the data tables,
    returning at least one data set resulting from the use of the data category definition table and the data tables having information that uniquely relates the plurality of data sources based on unique names,
    reading a manual flag indicating to the application programs whether manual entry of a data set of the data category is enabled or not,
    retuning manual flag information to the application programs,
    writing the data set to one of the data tables by performing the following:
        receiving one of the unique names from an application program,
        returning the key field and data field names of the data table of the data category having the one unique name to the application program, and
        receiving a data set and the one of the unique names from the application program, each data value of the data set being assigned to one of the key field or data field names, and
    reading the data set from one of the data tables by performing the following:

receiving one of the unique names from an application program, returning the key field names of the data table of the data category having the one unique name to the application program, receiving a query with the key field names from the application program, and returning the at least one data set resulting from the query to the application program.

16. The computer program product of claim 15, the computer program product further comprising instructions for assigning a semantic description to the data types on the basis of the data category definition table.

* * * * *